US011262279B2

(12) United States Patent
Lee et al.

(10) Patent No.: US 11,262,279 B2
(45) Date of Patent: Mar. 1, 2022

(54) SPECIMEN FOR ANALYZING SHAPE OF ANTISTATIC ANTIFOULING LAYER AND METHOD FOR PREPARING SAME

(71) Applicant: LG Chem, Ltd., Seoul (KR)

(72) Inventors: Bo Ri Lee, Daejeon (KR); Byung Su Park, Daejeon (KR)

(73) Assignee: LG Chem, Ltd.

( * ) Notice: Subject to any disclaimer, the term of this patent is extended or adjusted under 35 U.S.C. 154(b) by 9 days.

(21) Appl. No.: 16/643,717

(22) PCT Filed: Dec. 4, 2018

(86) PCT No.: PCT/KR2018/015232
§ 371 (c)(1),
(2) Date: Mar. 2, 2020

(87) PCT Pub. No.: WO2019/112284
PCT Pub. Date: Jun. 13, 2019

(65) Prior Publication Data
US 2020/0209116 A1    Jul. 2, 2020

(30) Foreign Application Priority Data

Dec. 7, 2017   (KR) .......................... 10-2017-0167151

(51) Int. Cl.
*G01N 1/00*   (2006.01)
*G01N 1/28*   (2006.01)
(Continued)

(52) U.S. Cl.
CPC ............ *G01N 1/2813* (2013.01); *G01N 1/36* (2013.01); *G01N 23/2251* (2013.01); *G01N 2001/364* (2013.01); *G01N 2223/03* (2013.01)

(58) Field of Classification Search
None
See application file for complete search history.

(56) References Cited

U.S. PATENT DOCUMENTS

| 5,977,543 A | 11/1999 | Ihn et al. |
| 2005/0048262 A1 | 3/2005 | Nakagawa et al. |

(Continued)

FOREIGN PATENT DOCUMENTS

| CN | 102504485 A | 6/2012 |
| JP | H5223755 A | 8/1993 |

(Continued)

OTHER PUBLICATIONS

International Search Report for Application No. PCT/KR2018/015232 dated Mar. 28, 2019.

(Continued)

*Primary Examiner* — Jyoti Nagpaul
(74) *Attorney, Agent, or Firm* — Lerner, David, Littenberg, Krumholz & Mentlik, LLP (57) ABSTRACT

A specimen for analyzing the shape of an antistatic antifouling layer and a method for preparing the same are provided. The specimen includes Pt coated on an antistatic antifouling layer comprising a conductive polymer formed on a polymer substrate, so that a contrast difference between the polymer substrate layer and the antistatic antifouling layer is caused by the diffusion of Pt by means of the conductive polymer and the dyeing effect of the antifouling layer. Accordingly, it is possible to clearly distinguish the shape of the antistatic antifouling layer formed on the polymer substrate by using TEM.

9 Claims, 6 Drawing Sheets

(51) Int. Cl.
*G01N 1/36* (2006.01)
*G01N 23/2251* (2018.01)

(56) References Cited

U.S. PATENT DOCUMENTS

| | | | |
|---|---|---|---|
| 2012/0302676 A1* | 11/2012 | Oya | C08J 5/18 524/89 |
| 2015/0037577 A1 | 2/2015 | Kataoka et al. | |
| 2017/0101543 A1 | 4/2017 | Hironaga et al. | |

FOREIGN PATENT DOCUMENTS

| | | | |
|---|---|---|---|
| JP | 2001121273 A | 5/2001 |
| JP | 2001316595 A | 11/2001 |
| JP | 2005095870 A | 4/2005 |
| JP | 2006038660 A | 2/2006 |
| JP | 2012202834 A | 10/2012 |
| JP | 2014026122 A | 2/2014 |
| JP | 2015030770 A | 2/2015 |
| KR | 19980021928 A | 6/1998 |
| KR | 200413739 Y1 | 4/2006 |
| KR | 100738317 B1 | 7/2007 |
| KR | 20070071992 A | 7/2007 |
| KR | 20090120636 A | 11/2009 |
| KR | 20160079714 A | 7/2016 |
| KR | 101686386 B1 | 12/2016 |
| KR | 20180035085 A | 4/2018 |
| WO | 2010116857 A1 | 10/2010 |
| WO | 2011140658 A1 | 11/2011 |
| WO | 2012157682 A1 | 11/2012 |
| WO | 2017115644 A1 | 7/2017 |

OTHER PUBLICATIONS

Dash et al.,"Electrooxidation of formic acid at platinum nanoclusters electrodeposited on PEDOT coated carbon paper electrode", J Appl Electrochem, Published Online Nov. 26, 2011, vol. 42, No. 1, pp. 59-67.

Extended European Search Report including Written Opinion for Application No. EP18885317.0 dated Dec. 14, 2020, 7 pages.

Rajesh et al., "Conducting polymeric nanotubules as high performance methanol oxidation catalyst support", Chemical Communications, Jan. 1, 2003, No. 16, The Royal Society of Chemistry, pp. 2022-2023.

* cited by examiner

Fig. 5

SPECIMEN FOR ANALYZING SHAPE OF ANTISTATIC ANTIFOULING LAYER AND METHOD FOR PREPARING SAME

CROSS-REFERENCE TO RELATED APPLICATIONS

The present application is a national phase entry under 35 U.S.C. § 371 of International Application No. PCT/KR2018/015232, filed Dec. 4, 2018, which claims priority to Korean Patent Application No. 10-2017-0167151, filed Dec. 7, 2017, the disclosures of which are incorporated herein by reference.

TECHNICAL FIELD

The present invention relates to a specimen used for analyzing shape of an antistatic antifouling layer and a method for manufacturing thereof, and more specifically, to a specimen useful for analyzing shape of an antistatic antifouling layer by using TEM and a method for manufacturing thereof.

BACKGROUND ART

A polarizing plate protective film protects the surface of a product by sticking to a polarizing plate and a backlight unit in the LCD manufacturing process. As the polarizing plate protective film, a polyethylene terephthalate (PET) film is generally used. In order to prevent contamination of the film, an antifouling layer having a thickness of several tens of nanometers is coated thereon. Further, this protective film is removed from the process at the final stage of the LCD module production process. Defect occurs due to weak static electricity of about 1 kV to 5 kV generated when the film is peeled off, and the defect rate is known to be about 20%. Therefore, an antistatic antifouling layer made by mixing a conductive polymer such as poly(3,4-ethylenedioxythiophene)polystyrene sulfonate (PEDOT:PSS) with a binder such as polyurethane is coated on a PET film to prevent the defects caused by static electricity.

DISCLOSURE

Technical Problem

The problem to be solved by the present invention is to provide a specimen that can more clearly analyze shape of an antistatic antifouling layer formed on a polymer substrate using TEM and a method for manufacturing thereof.

Further, the present invention is to provide a method for analyzing shape of the antistatic antifouling layer formed on a polymer substrate using the specimen.

Technical Solution

In order to solve the above-mentioned problems, the present invention provides a specimen for analyzing shape of an antistatic antifouling layer comprising: a polymer substrate; an antistatic antifouling layer, which is formed on the polymer substrate and contains a conductive polymer; and a Pt (platinum) coating layer directly formed on the antistatic antifouling layer.

According to one embodiment, the specimen may further comprise a carbon protective film on the Pt coating layer.

Further, the present invention provides a method for manufacturing the specimen for analyzing shape of an antistatic antifouling layer, which comprises the following steps of:

forming the antistatic antifouling layer containing a conductive polymer formed on the polymer substrate; and directly forming the Pt coating layer on the antistatic antifouling layer.

According to one embodiment, the method may further comprise a step of forming the carbon protective film on the Pt coating layer.

According to one embodiment, the conductive polymer may contain PEDOT:PSS.

According to one embodiment, the antistatic antifouling layer may be made from a composition containing the conductive polymer of 2 wt % to 20 wt % and a polymer resin binder of 80 wt % to 98 wt %.

According to one embodiment, the thickness of the antistatic antifouling layer may be 30 nm to 200 nm.

According to one embodiment, the thickness of the Pt coating layer may be 5 nm to 20 nm.

Further, in order to solve another problem of the present invention, the present invention provides a method for analyzing shape of the antistatic antifouling layer using TEM to the specimen manufactured by the above-mentioned method.

Advantageous Effects

According to the present invention, directly coating Pt on the antistatic antifouling layer, which is formed on a polymer substrate and contains a conductive polymer, is resulted in the contrast difference between the polymer substrate layer and the antistatic antifouling layer due to the diffusion of Pt by the conductive polymer and the dyeing effect of the antifouling layer. This makes it possible to more clearly distinguish shape of the antistatic antifouling layer formed on the polymer substrate using TEM.

BEST MODE CARRYING OUT THE INVENTION

Various changes in form and details may be made to the presently disclosed embodiment and thus should not be construed as being limited to the aspects set forth herein. The presently disclosed embodiment is not limited to the aspects described in the present description, and thus it should be understood that the presently disclosed embodiment includes every kind of variation example or alternative equivalent included in the spirit and scope of the presently disclosed embodiment. Also, while describing the aspects, detailed descriptions about related well-known functions or configurations that may diminish the clarity of the points of the aspects of the presently disclosed embodiment will be omitted.

The present invention relates to a specimen useful for analyzing shape of an antistatic antifouling layer by using TEM and a method for manufacturing thereof.

Herein, the term TEM should be understood to include transmission electron microscopes of all kinds, for example, all of Universal design TEM, Scanning transmission electron microscope (STEM), Field emission transmission electron microscope (FE-TEM) and the like.

A polarizing plate protective film coated with an antifouling layer, which includes a conductive polymer and has an antistatic function, can exhibit a tendency to change the surface resistance depending on the thickness of the antifouling layer. In order to analyze to confirm the correlation between the thickness of the antifouling layer and the surface resistance, the thickness of the antistatic antifouling layer formed on the protective film should be clearly measured.

However, in general, the thickness of the antifouling layer is about 50 nm, which is very thin, and both of the substrate and the antifouling layer are carbon compounds. Accordingly, there is a problem that it is difficult to observe the antifouling layer using an electron microscope due to small contrast range.

In order to solve the above-mentioned problems, the present invention provides a specimen for analyzing shape of an antistatic antifouling layer comprising: a polymer substrate; an antistatic antifouling layer, which is formed on the polymer substrate and contains a conductive polymer; and a Pt coating layer directly formed on the antistatic antifouling layer.

According to a preferred embodiment, the specimen may further comprise a carbon protective film on the Pt coating layer.

Further, the present invention provides a method for manufacturing the specimen for analyzing shape of an antistatic antifouling layer, which comprises the following steps of:

forming the antistatic antifouling layer containing a conductive polymer formed on the polymer substrate; and directly forming the Pt coating layer on the antistatic antifouling layer.

According to the present invention, the antistatic antifouling layer and the substrate can be clearly distinguished by measuring the Transmission electron microscope (TEM) after coating the surface of the antistatic antifouling layer directly with Pt.

In the present invention, the Pt coating may be applied by using techniques known in the art such as sputtering, but not particularly limited thereto.

Further, the method of the present invention may further comprise a step of forming the carbon protective film on the Pt coating layer. The carbon protective film may be formed by using techniques known in the art such as a technique to draw an organic ink pen such as an oil-based pen on an area of interest, but not particularly limited thereto.

In particular, in the case of using a focused ion beam (FIB) to manufacture a specimen for TEM analysis, it is preferred to form the carbon protective film on the Pt coating layer.

In general, in the case of manufacturing a thin specimen of a polymer sample using an FIB (Focused Ion Beam), a carbon protective film has been formed and then the Pt coating has been pretreated to protect the polymer surface relatively weak against the ion beam. However, in this conventional method, there has been difficult to observe the thickness and shape of the antifouling layer formed on the polymer substrate since both the polymer substrate and the antifouling layer are made of carbon compounds and therefore, there is no contrast difference.

In the method for manufacturing a TEM thin specimen of a polymer sample, Pt coating, which has been carried out after the formation of the carbon protective film (carbon protection), is directly performed on the antifouling layer, the present invention can obtain an effect that Pt is diffused and stained by the conductive polymer contained in the antifouling layer. This effect causes contrast between the Pt coating layer, the antifouling layer and the substrate layer to clearly distinguish the boundaries of the Pt coating layer, the antifouling layer and the substrate layer. Thus, the shape and thickness of the antifouling layer formed on the substrate can be more clearly measured.

The antistatic antifouling layer may be formed by the method known in the art, but not particularly limited thereto. For example, it may be made from a composition containing the conductive polymer of 2 wt % to 20 wt % and a polymer resin binder of 80 wt % to 98 wt %, and if desired, various additives may be further included. The content of the conductive polymer may be 2 wt % to 20 wt %, preferably 2 wt % to 15 wt %, more preferably 2 wt % to 10 wt %, based on the total weight of the composition for forming an antifouling layer.

According to one embodiment, the conductive polymer may be at least one selected from the group consisting of polythiophene-based, polypyrrole-based, polystyrene-based and polyaniline-based polymers, and preferably, it may be polythiophene-based conductive polymer or polystyrene-based conductive polymer.

In general, as the conductive polymer used for the antistatic antifouling layer, PEDOT:PSS, which is a conductive polymer doped with polystyrene sulfonic acid (PSS) as a dopant in an aqueous dispersion in which polyethylene disocythiophene (PEDOT), can be mainly used, and it can be confirmed that the surface resistance is lowered by applying PEDOT:PSS to the antistatic antifouling layer. However, it is not limited thereto, and the known conductive polymers can be used without limitation.

As shown in the following Chemical Formula 1, the PEDOT:PSS is a polymer in which two ionomers are combined, and the sulfonyl group of the sulfonated polystyrene has a negative charge and the polythiophene part of the PEDOT has a positive charge. Therefore, the PEDOT:PSS can exhibit a high electrical conductivity of around 1000 S/cm by only a simple doping.

[Chemical Formula 1]

Further, the polymer resin binder may contain at least one polymer resin selected from the group consisting of polyester-based, polyurethane-based, acryl resin-based, polyvinyl-based and polyolefin-based resins, preferably polyurethane-based polymer.

The polymer substrate used as a protective film may contain at least one polymer selected from the group consisting of polyester, polystyrene, polyimide, polyamide, polysulfonate, polycarbonate, polyacrylate, polyethylene, polypropylene and the like.

According to one embodiment, the thickness of the antistatic antifouling layer may be 30 nm to 200 nm, preferably 30 nm to 150 nm.

According to one embodiment, the Pt coating layer may be coated to the thickness of 5 nm to 20 nm, preferably 5 nm to 15 nm, more preferably 5 nm to 10 nm.

In the present invention, as the Pt is directly coated on the antistatic antifouling layer containing the conductive polymer, Pt contained in the Pt coating layer is diffused into the antifouling layer, and the pretreatment effect such as dyeing in the electron microscopic pretreatment technique is applied to induce the contrast difference between the substrate and the antifouling layer. For example, the ionic interaction between the negative charge of the PEDOT:PSS that is a conductive polymer in the antifouling layer and the positive charge of the Pt metal generated during the Pt coating may occur, and the Pt may diffuse into the antifouling layer, resulting in the contrast difference with the substrate.

According to one embodiment, the content of the Pt contained in the antistatic antifouling layer can be distributed in a substantially constant amount in the entire region of the antifouling layer regardless of the distance from the Pt coating layer. Analysis of the Pt content in the antifouling layer revealed that the Pt content in the end region of the antifouling layer decreased in a stepwise manner while maintaining almost constant content in the entire region of the antifouling layer unlike the general diffusion profile showing a tail shape. This may indicate that the Pt is not only diffused into the antifouling layer but can also be an effect of staining only the antifouling layer through a kind of reaction.

MODE FOR INVENTION

Hereinafter, the working examples of the present invention will be explained in detail so that an ordinary skilled in the art can easily carry out the present invention. The accompanying examples are provided for illustration only and should not be construed as limiting the scope of the invention.

Analyzing Apparatus

Pt Coating System (Hitachi E-1030)

In order to protect the surface of a sample and reduce the charging phenomenon, the coating thickness was estimated to be 10 nm by sputtering for 100 sec.

A carbon protective layer was formed by applying oil on the area of interest to be observed by using an oil-based pen containing an organic ink.

Dual beam focused ion beam (FEI Helios450F1)

It was used to make a thin slice of 100 nm thick or less. Ion beam current was reduced to 9.3 nA and 80 pA and processed sequentially.

TEM (FE-STEM, TITIAN G2 80-200 Chemi-STEM)

It was used for observing an antifouling layer (Acceleration voltage: 8-200 kV, Resolution: point of resolution (240 pm), Energy spread: 0.8 Ev).

Comparative Example 1:
PET/PEDOT:PSS-PU/Carbon Protection/Pt

Figure 1:
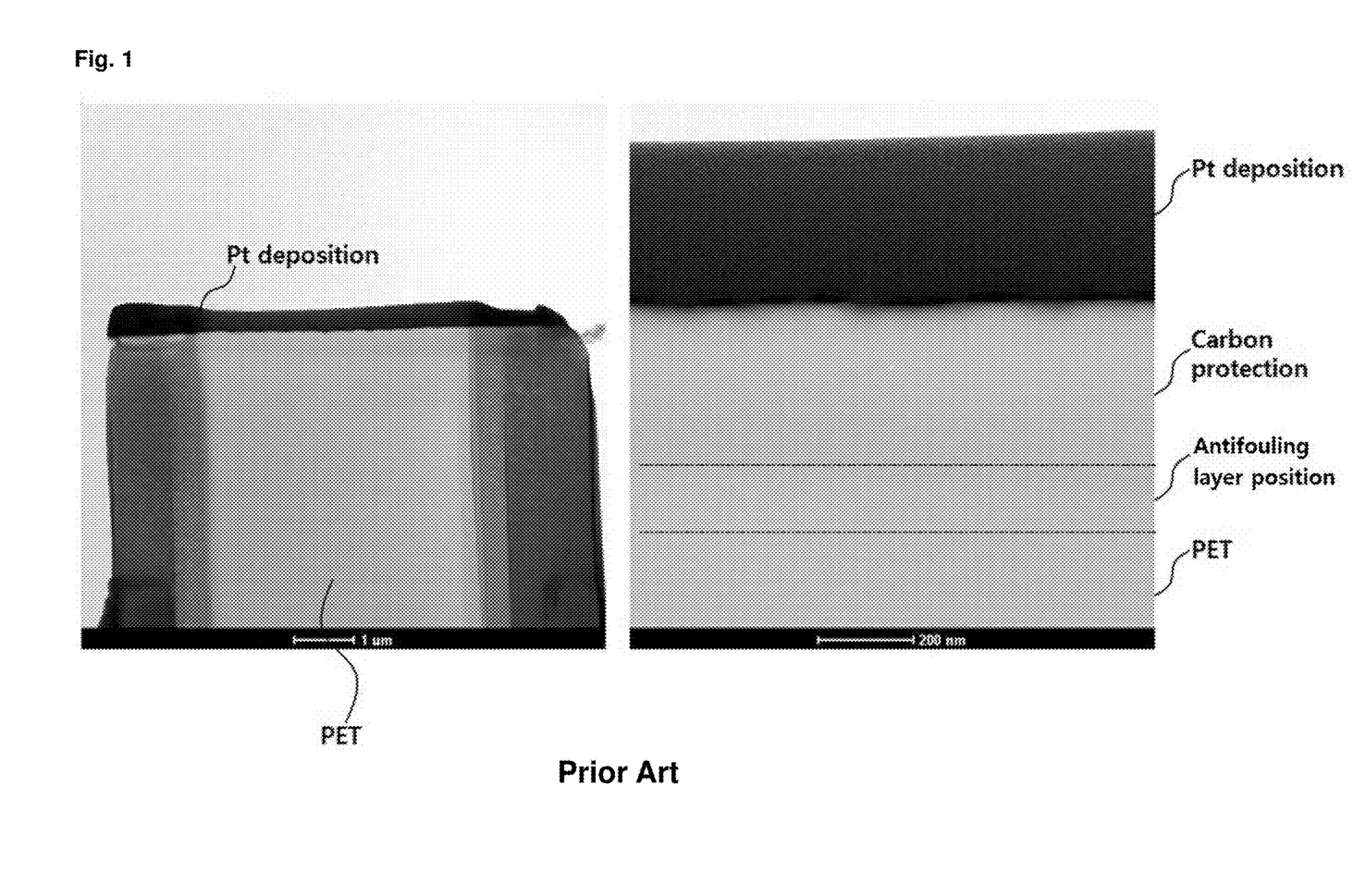
FIG. 1 is a FE-TEM image of a specimen including a PET/antifouling layer manufactured by the conventional method.

An antistatic antifouling layer was formed to the target thickness of about 50 nm on a PET substrate using a composition containing 3 wt % of PEDOT:PSS conductive polymer and 97 wt % of polyurethane (PU) binder. After carbon protection was performed to protect the surface of the antistatic antifouling layer, a Pt coating layer was formed on the carbon protective layer to a thickness of 10 nm to manufacture a laminate that is laminated in order of PET/PEDOT:PSS-PU/carbon protection/Pt. A specimen of the laminate for TEM measurement was prepared using FIB. A FETEM STEM BF image of the prepared specimen is shown in FIG. 1.

In the case of the specimen pretreated as described above, since the antifouling layer is a carbon-based thin layer and the PET and the carbon protective layer are also carbon-based materials, it is difficult to distinguish the antifouling layer because there is no contrast difference on the TEM image.

Example 1: PET/PEDOT:PSS-PU/Pt/Carbon Protection

An antistatic antifouling layer was formed to the target thickness of about 50 nm on a PET substrate using a composition containing 3 wt % of PEDOT:PSS conductive polymer and 97 wt % of polyurethane (PU) binder. A Pt coating layer was formed on the antistatic antifouling layer to a thickness of 10 nm and then a carbon protection was formed thereon to manufacture a laminate that is laminated in order of PET/PEDOT:PSS-PU/Pt/carbon protection. A specimen of the laminate for TEM measurement was prepared using FIB. A FETEM STEM BF image of the prepared specimen is shown in FIG. 2.

Figure 2:
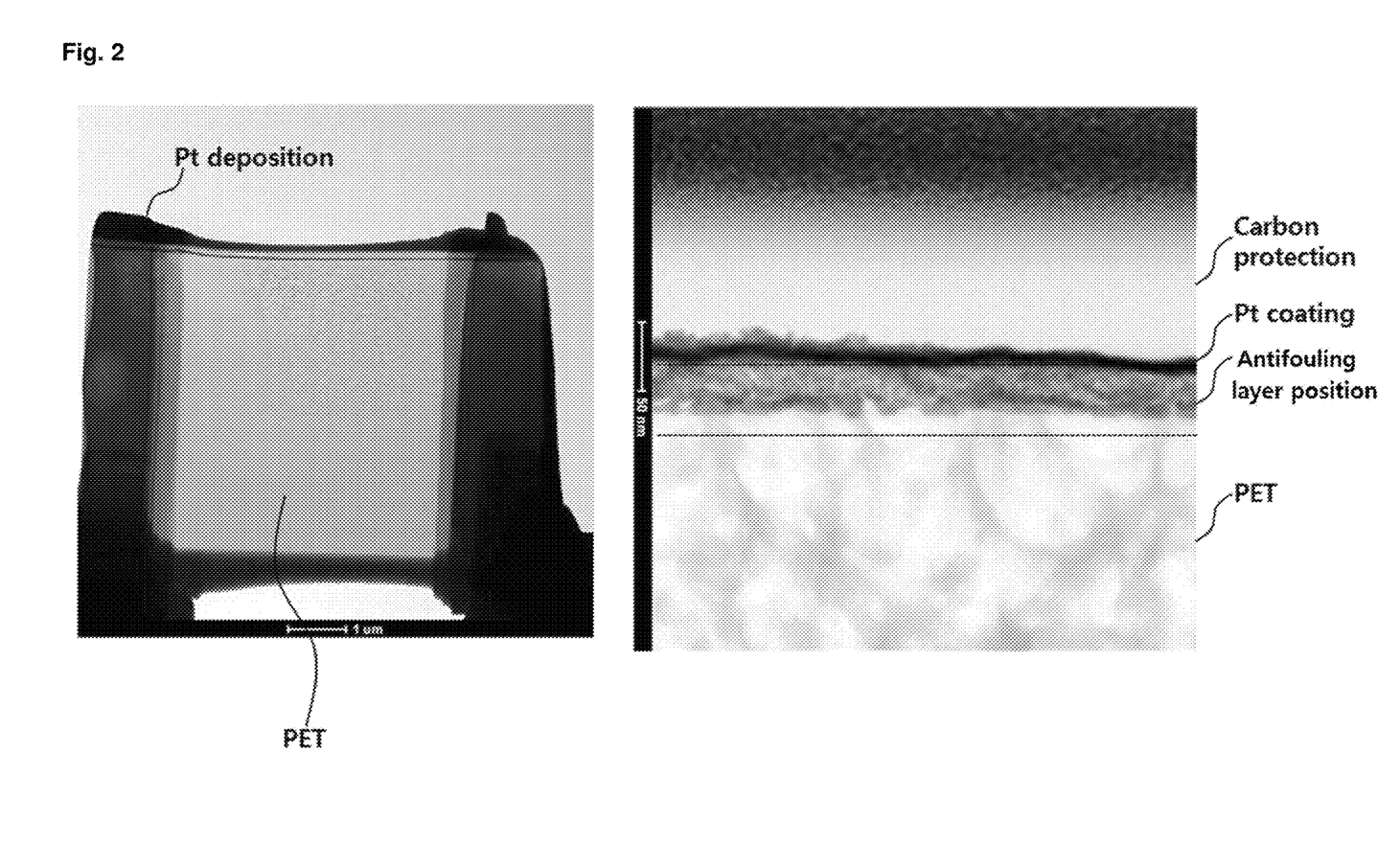
FIG. 2 is a Field Emission Transmission Electron Microscopy (FETEM)-bright-field (BF) image of a specimen including a PET/polyurethane-PEDOT:PSS antifouling layer manufactured by the method according to an embodiment of the present invention.

As can be seen from the results of FIG. 2, the boundary between the antifouling layer and the carbon protective layer can be distinguished by the Pt coating layer which is observed relatively darker than the carbon compound. Further, a layer with contrast different from the Pt coating layer under the Pt coating layer was additionally observed, and the thickness of the layer was measured at about 50 nm, which is similar to the thickness of the antifouling layer. From this, it can be seen that the antifouling layer can exhibit a clear contrast with the PET layer which is a polymer substrate made of only a carbon compound. Further, in the TEM image, the boundary between the PET substrate and the antifouling layer was observed to be flat, and it can be clearly distinguished that the overall thickness of the layer is constant.

Figure 3A:
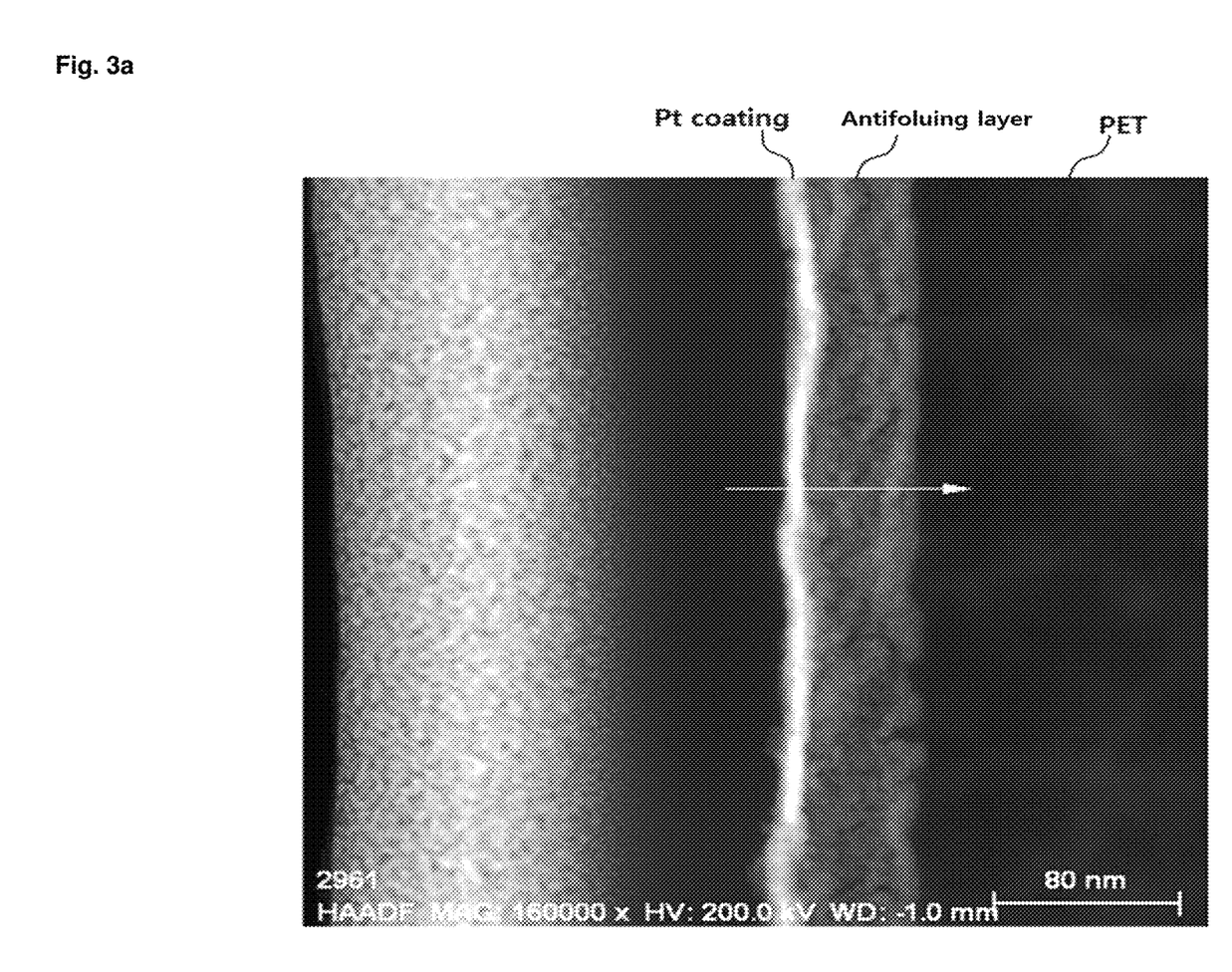
FIGS. 3a and 3b are the results of measuring Energy Dispersive Spectrometer (EDS), which analyzes the content of Pt contained in the specimen including PET/polyurethane-PEDOT:PSS antifouling layer manufactured by the method according to an embodiment of the present invention.
Figure 3B:
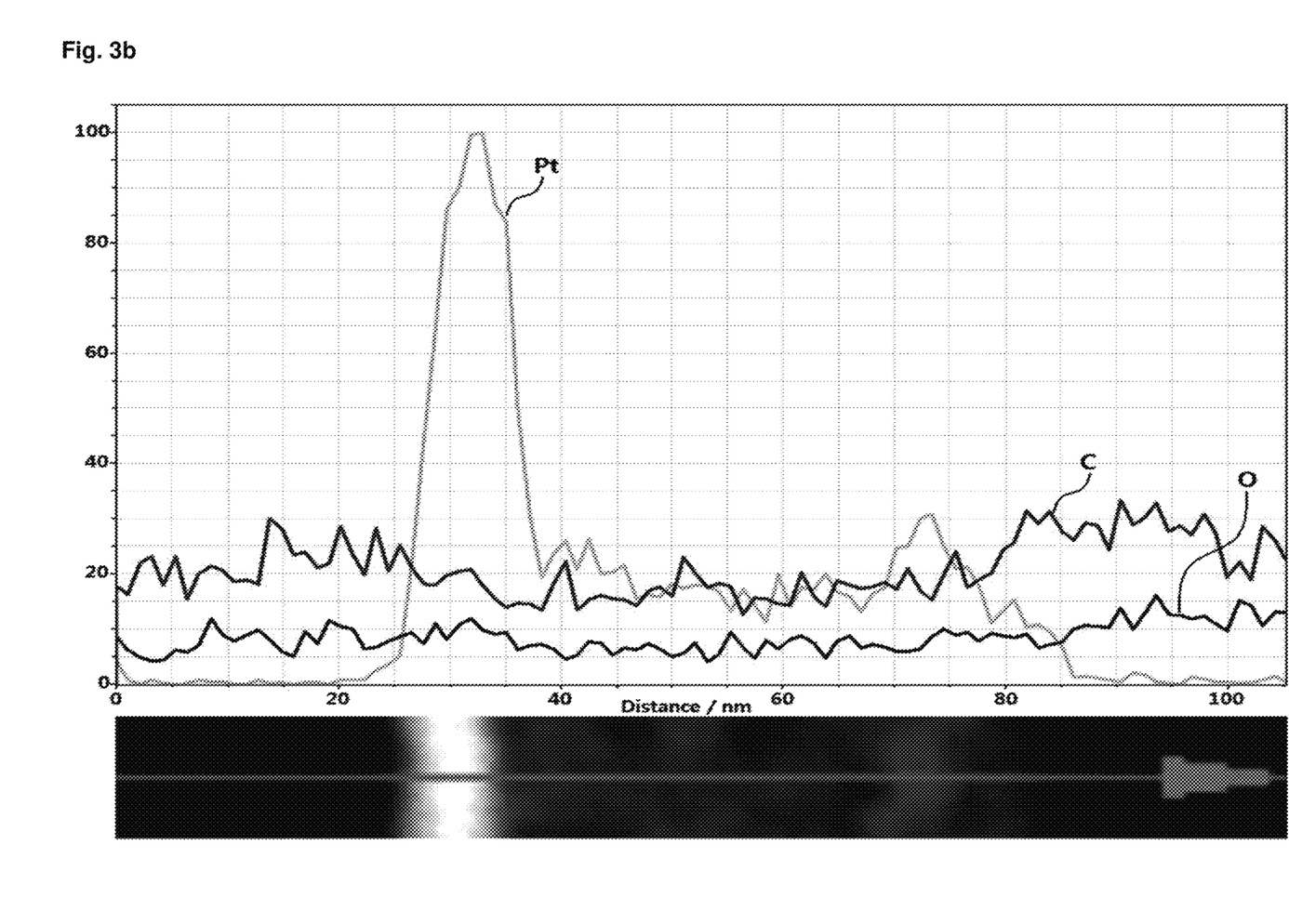

Accordingly, Energy Dispersive Spectrometer (EDS) component analysis of the antifouling layer was performed to analyze the Pt content in the antifouling layer. The analysis results are shown in FIGS. 3a and 3b. As a result of the above EDS analysis, Pt was detected inside the antifouling layer, and as a result of the line scan, as shown in FIG. 3b, a constant amount of Pt was detected in the antifouling layer regardless of the distance from the Pt coating layer. From the above results, it can be seen that Pt of the Pt coating layer is diffused into the antifouling layer, and due to the diffusion of Pt, the antifouling layer is provided with a relatively dark contrast so that the antifouling layer formed on the polymer substrate can be clearly observed.

Further, as one uniqueness of the present invention, in contrast to the typical diffusion characteristics with a tail shape whose content is gradually decreased according to the distance, the profile of the Pt content measured in the antifouling layer is almost constant in the antifouling layer and is decreased in a stepwise manner in the end region of the antifouling layer. It can be seen that Pt is not simply diffused into the antifouling layer, but it has the effect of staining only the antifouling layer through a kind of reaction. This may be due to the reaction with PEDOT:PSS contained in the antifouling layer.

Comparative Example 2: PET/PU/Pt/Carbon Protection

An antistatic antifouling layer was formed to the target thickness of about 50 nm on a PET substrate using a composition containing polyurethane (PU) binder. A Pt coating layer was formed on the antistatic antifouling layer to a thickness of 10 nm and then a carbon protection was formed thereon to manufacture a laminate that is laminated in order of PET/PU/Pt/carbon protection. A specimen of the laminate for TEM measurement was prepared using FIB. A FETEM STEM BF image of the prepared specimen is shown in FIG. 4.

Figure 4:
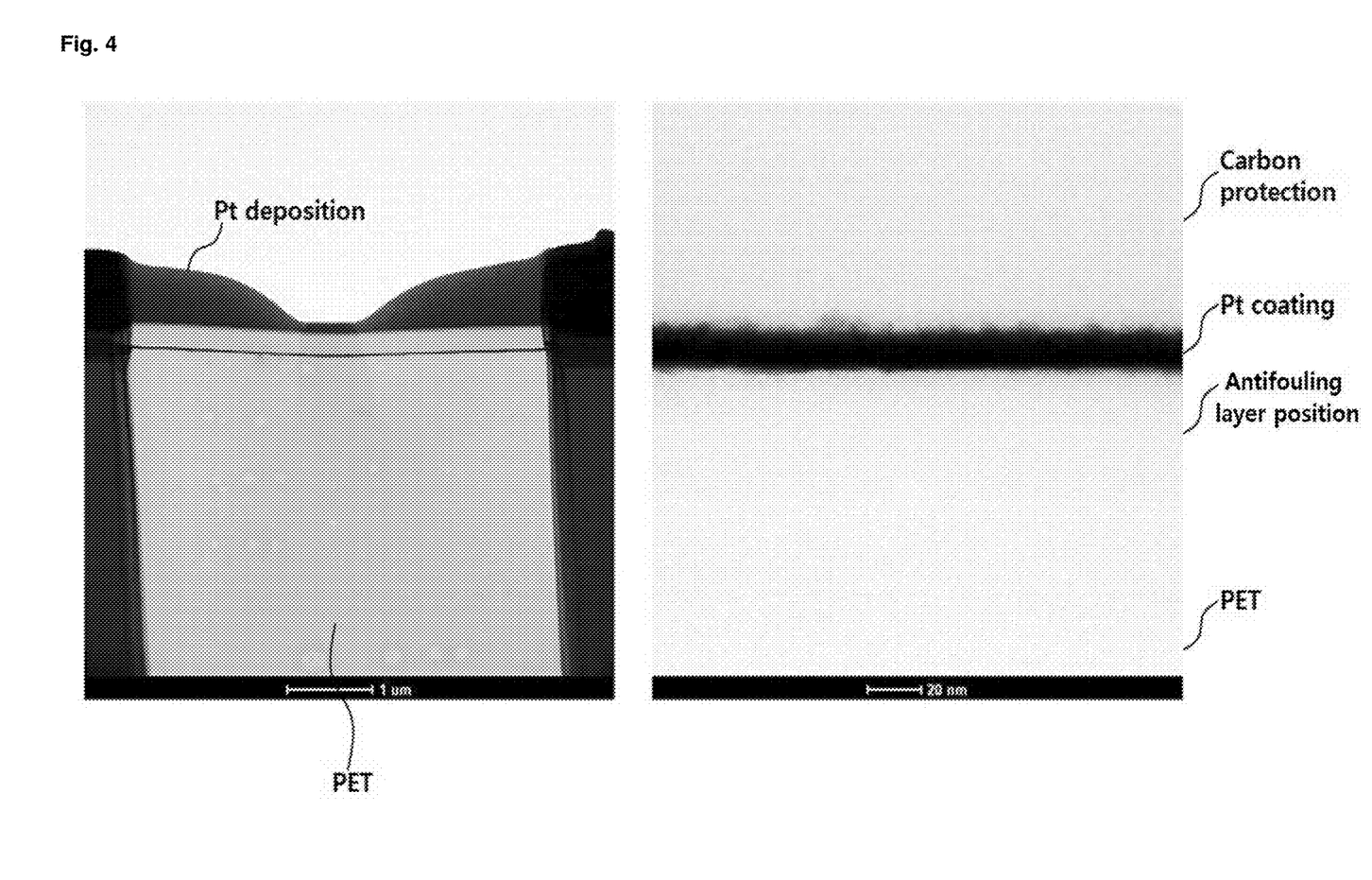
FIG. 4 is a FETEM-BF image of a specimen including the antifouling layer formed with only polyurethane according to Comparative Example 2.

As shown in FIG. 4, in the specimen obtained by coating only polyurethane (PU) to the same thickness without PEDOT:PSS conductive polymer as described above, no antifouling layer was observed and only the Pt coating layer was confirmed.

Thus, it can be seen that PEDOT:PSS diffuses the Pt of the Pt coating layer into the antifouling layer and at the same time, it induces the reaction with PEDOT:PSS, allowing the observation of the antifouling layer in the TEM image. The diffusion reaction can be assumed to be due to the ionic interaction between the negative charge of PEDOT:PSS and the positive charge of Pt (metal).

Example 2: Analysis of Antifouling Layer Trend by Thickness

Two specimens were prepared to the target thickness of 50 nm and 150 nm.

Antistatic antifouling layers were formed to the target thickness of about 50 nm and 150 nm on PET substrates, respectively, using a composition containing 3 wt % of PEDOT:PSS conductive polymer and 97 wt % of polyurethane (PU) binder. Pt coating layers were formed on the antistatic antifouling layers to a thickness of 10 nm and then carbon protections were formed thereon to manufacture laminates that are laminated in order of PET/PEDOT:PSS-PU/Pt/carbon protection. Specimens of the laminates for TEM measurement were prepared using FIB.

Figure 5:
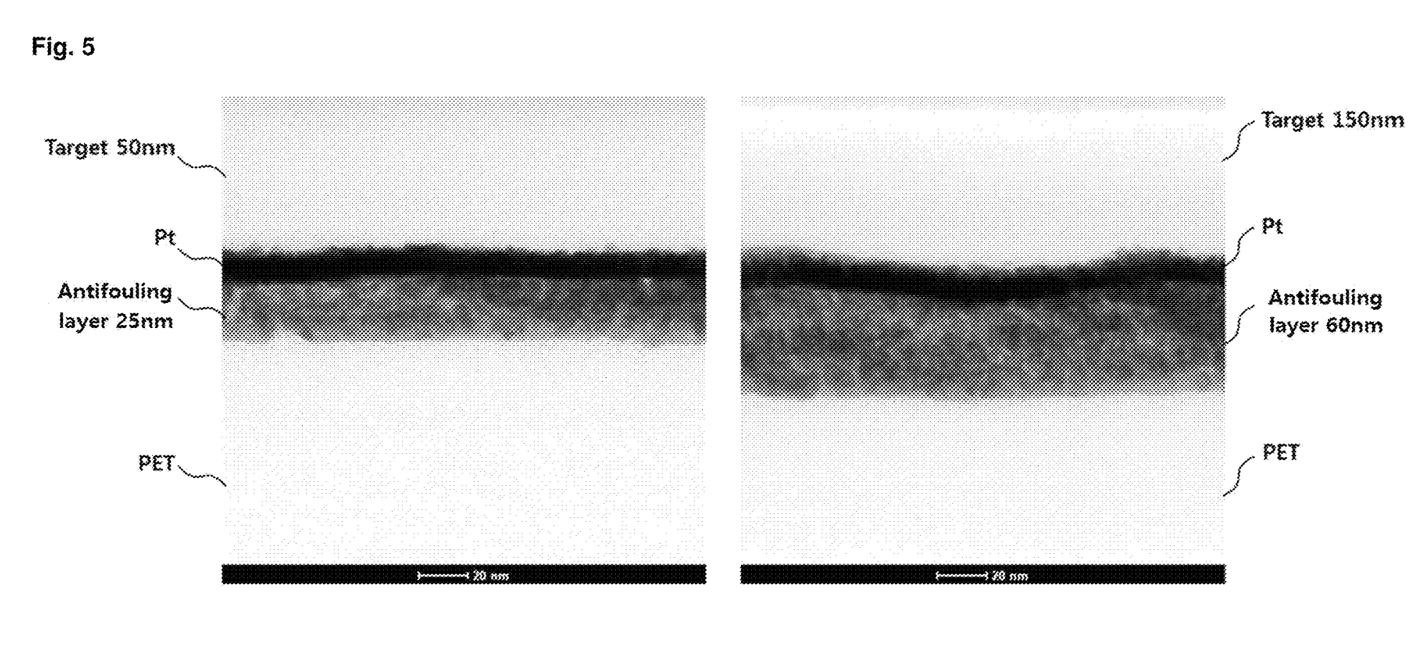
FIG. 5 is a FETEM-BF image with antifouling layer thickness variation in the specimen including PET/polyurethane-PEDOT:PSS antifouling layer manufactured by the method according to an embodiment of the present invention.

A TEM image of the prepared specimen is shown in FIG. 5. The specimen target thickness of 50 nm was measured at about 25 nm, and the specimen target thickness of 150 nm was measured at about 60 nm. The measured thickness was measured to be thinner than the expected thickness. It can be expected that the specimen made in the laboratory is coated thinner than the target thickness. However, it was confirmed that the thickness difference measured is about three times, which is consistent with the target thickness difference.

From the above results, it can be seen that not only the antifouling layer can be clearly observed in the TEM image through the simple pretreatment of the Pt coating but also the Pt of the Pt coating layer is diffused into the antifouling layer by the conductive polymer PEDOT:PSS and reacted.

It should be understood that those skilled in the art can carry out other modifications without changing its technical spirit or essential features. Therefore, the above-described embodiment of the present invention is merely exemplary in all aspects and should not be construed to be limited, and it should be understood that the scope of the present invention is defined by the following claims and the meanings and ranges of the claims and all modifications and changed forms derived from their equivalents pertain to the scope of the present invention.

The invention claimed is:

1. A specimen for analyzing shape of an antistatic antifouling layer comprising:
    a polymer substrate;
    an antistatic antifouling layer, which is formed on the polymer substrate and contains a conductive polymer; and
    a Pt coating layer directly formed on the antistatic antifouling layer.

2. The specimen according to claim 1, further comprising a carbon protective film on the Pt coating layer.

3. The specimen according to claim 1, wherein the conductive polymer contains PEDOT:PSS.

4. The specimen according to claim 1, wherein the antistatic antifouling layer is made from a composition containing the conductive polymer in an amount of 2 wt % to 20 wt % and a polymer resin binder in an amount of 80 wt % to 98 wt %.

5. The specimen according to claim 1, wherein a thickness of the antistatic antifouling layer is 30 nm to 200 nm.

6. The specimen according to claim 1, wherein a thickness of the Pt coating layer is 5 nm to 20 nm.

7. A method for analyzing shape of an antistatic antifouling layer comprising preparing the specimen of claim 1.

8. A method for manufacturing a specimen for analyzing shape of an antistatic antifouling layer, comprising:
    forming an antistatic antifouling layer containing a conductive polymer formed on a polymer substrate; and
    directly forming a Pt coating layer on the antistatic antifouling layer.

9. The method according to claim 8, further comprising forming a carbon protective film on the Pt coating layer.

* * * * *